United States Patent [19]

Kurihara

[11] Patent Number: 5,045,943

[45] Date of Patent: Sep. 3, 1991

[54] SYNCHRONOUS SIGNAL SEPARATION CIRCUIT

[75] Inventor: Ikuo Kurihara, Chigasaki, Japan

[73] Assignee: Canon Kabushiki Kaisha, Tokyo, Japan

[21] Appl. No.: 403,032

[22] Filed: Sep. 1, 1989

Related U.S. Application Data

[63] Continuation of Ser. No. 125,775, Nov. 25, 1987, abandoned, which is a continuation of Ser. No. 28,006, Mar. 18, 1987, abandoned, which is a continuation of Ser. No. 832,215, Feb. 24, 1986, abandoned.

[30] Foreign Application Priority Data

Feb. 28, 1985 [JP] Japan ................................. 60-37385

[51] Int. Cl.$^5$ ............................................. H04N 5/08
[52] U.S. Cl. ..................................... 358/153; 307/350
[58] Field of Search ............... 358/153, 155, 156, 157; 307/350, 358, 362; 328/139

[56] References Cited

U.S. PATENT DOCUMENTS

| 4,254,435 | 3/1981 | Dayton et al. | 358/153 |
| 4,491,743 | 1/1985 | Smith | 307/362 |
| 4,635,115 | 1/1987 | Kamiya | 358/153 |

FOREIGN PATENT DOCUMENTS

| 0080965 | 7/1981 | Japan | 358/153 |
| 0102164 | 8/1981 | Japan | 358/153 |
| 0220585 | 12/1983 | Japan | 358/155 |
| 0198971 | 10/1985 | Japan | 358/153 |

Primary Examiner—Howard W. Britton
Assistant Examiner—David E. Harvey
Attorney, Agent, or Firm—Fitzpatrick, Cella, Harper & Scinto

[57] ABSTRACT

A circuit for separating a synchronous signal from a video signal including a comparator and a bias circuit. The comparator is adapted to receive a video signal which also includes a synchronous signal. The comparator generates a pulse signal whose voltage increases when the voltage of the video signal exceeds a reference value and decreases when the voltage of the video signal is below the reference level. The bias circuit is responsive to an increase in the voltage of the synchronous signal for shifting the voltage of the video signal input into the comparator by a predetermined value which is smaller than the amount by which the voltage of the synchronous signal increases, in the same direction in which the video signal increases above the reference level.

3 Claims, 1 Drawing Sheet

SYNCHRONOUS SIGNAL SEPARATION CIRCUIT

This application is a continuation of application Ser. No. 125,775 filed Nov. 25, 1987, which is a continuation of application Ser. No. 028,006 filed Mar. 18, 1987, which is a continuation of application Ser. No. 832,215 filed Feb. 24, 1986 all of which are now abandoned.

BACKGROUND OF THE INVENTION

1. Field of the Invention

The present invention relates to a synchronous signal separation circuit for a video signal.

2. Related Background Art

A conventional synchronous signal separation circuit utilizes a rectifying characteristic of a PN junction of a diode or bipolar transistor and hence it is difficult to construct it by MOS devices.

SUMMARY OF THE INVENTION

It is an object of the present invention to provide a synchronous signal seperation circuit for a video signal, which allows implementation by MOS devices and integration onto a MOS integrated circuit and which, when implemented by bipolar devices, provides a higher precision than a conventional circuit.

It is another object of the present invention to provide a synchronous signal separation circuit including a comparator having a predetermined reference potential and a bias generation circuit having an output voltage shifted from a reference potential by a predetermined amount.

DESCRIPTION OF THE PREFERRED EMBODIMENTS

Figure 1:
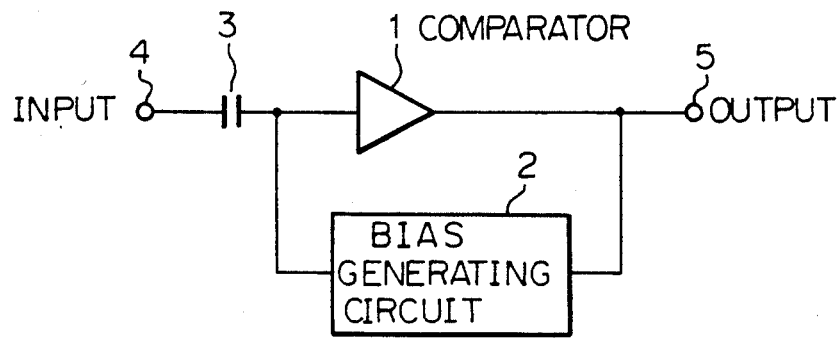
FIG. 1 shows a circuit diagram of a first embodiment of the present invention.

FIG. 1 shows a configuration of an embodiment of a synchronous signal separation circuit of the present invention. Numeral 1 denotes a comparator, numeral 2 denotes a bias circuit for generating a constant voltage, numeral 3 denotes a coupling capacitor, numeral 4 denotes a video input terminal, and numeral 5 denotes an output terminal. The comparator 1 and the bias circuit 2 are connected in parallel in a stage positioned after the coupling capacitor 3.

Figure 2:
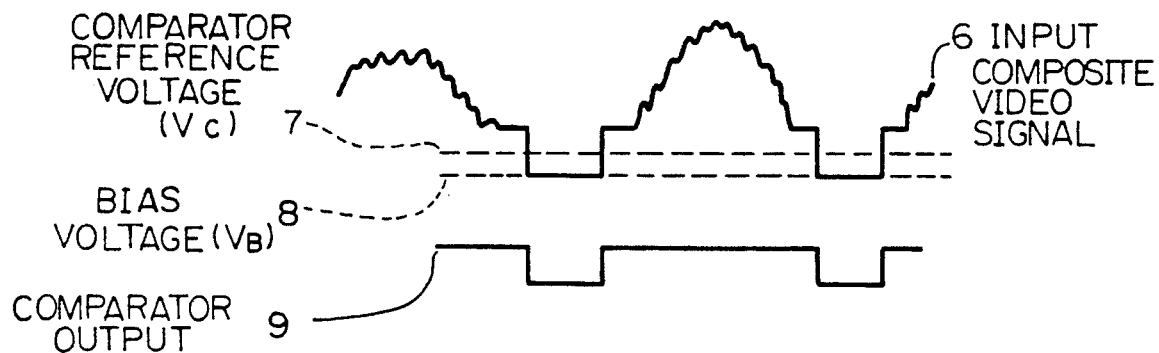
FIG. 2 shows waveforms in the circuit of FIG. 1.

FIG. 2 shows waveforms in the circuit of FIG. 1. Numeral 6 denotes an input composite video signal applied to the video input terminal 4, numeral 7 denotes a comparator reference potential ($V_C$) of the comparator 1, numeral 8 denotes a bias voltage ($V_B$) of the bias circuit 2, and numeral 9 denotes a comparator output of the comparator 1. In the present embodiment, the video signal 6 is applied as a negative-going synchronous signal.

The operation of the circuit of FIG. 1 is explained with reference to the waveforms of FIG. 2. The composite video signal 6 is applied to the input terminal 4 from a signal source (not shown) having an appropriate signal source impedance such as 75Ω. The comparator 1 has the predetermined reference potential 7 as shown in FIG. 2. The bias circuit 2 can produce the bias voltage $V_B$ which is lower than the reference potential $V_C$ of the comparator 1 by a predetermined voltage $\Delta V$. The bias output of the bias circuit 2 can assume either an externally controllable high impedance state or a constant voltage state.

As shown in FIG. 2, when the synchronous signal of the input composite video signal 6 exceeds, in a negative direction, the reference potential 7 of the comparator 1, the comparator output 9 assumes the low level. When signal 6 exceeds, in a positive direction, with reference potential 7 of comparator 1, the comparator output 9 assumes a high level. The bias circuit (bias voltage source) 2 produces the voltage $V_B = V_C - \Delta V$ and a potential difference between the input potential and the bias voltage source potential is held in the coupling capacitor 3. Thus, the synchronous signal in the input composite video signal 6 is clamped to the voltage $V_B$.

In a back-porch after the output period of the synchronous signal, the potential of the input composite video signal 6 rises by the potential of the synchronous signal portion. The potential rises from the synchronous signal portion to the back-porch portion in a sufficiently shorten time than a time constant determined by the internal impedance of the bias circuit 2 and the coupling capacitor 3. If the potential difference of the synchronous signal portion is larger than $\Delta V$, the output 9 of the comparator 1 assumes the high level and the bias output of the bias circuit 2 is cut off to assume the high impedance state. Since the video signal 6 is always of higher potential than the back-porch portion, it is in the next synchronous signal portion that the input voltage to the comparator 1 becomes lower than $V_C$, and the above operation is repeated in the next synchronous signal.

In this manner, the output 9 of the comparator 1 assumes the low level only in the synchronous signal portion of the input composite video signal 6, and the synchronous signal separation output is produced.

When the synchronization polarity of the input composite video signal 6 is positive, the synchronization signal can be separated by reversing the relation between the voltage $V_C$ and the voltage $V_B$ in the case the voltage $V_B$ is produced when the comparator 1 assumes the high level.

Figure 3:
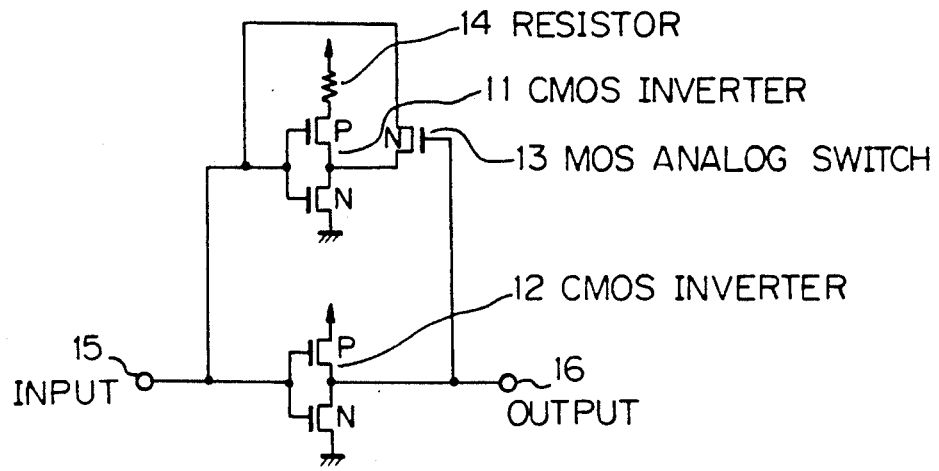
FIG. 3 shows a circuit diagram of a second embodiment of the present invention.

FIG. 3 shows a second embodiment of the synchronous signal separation circuit of the present invention. In the present embodiment, the synchronous signal separation circuit is constructed by MOS devices. Numerals 11 and 12 denote two CMOS inverters connected in parallel, numeral 13 denotes a MOS analog switch connected to a lower stage of the CMOS inverter 11, numeral 14 denotes a resistor connected to the CMOS inverter 11, numeral 15 denotes an input terminal, and a numeral 16 denotes an output terminal.

The CMOS inverters 11 and 12 are identical and have the same inverting potential. The MOS analog switch 13 shorts the input and output terminals of the CMOS inverter 11 to form the bias circuit to generate the bias potential, and the resistor 14 is connected to the CMOS inverter 11 to produce thereacross a voltage drop for developing a potential difference from the inverting potential. Since CMOS inverters 11 and 12 are identical, the inverting potential at the gate electrode junction of CMOS inverter 11 and input 15 can be lowered by the voltage drop across the resistor 14. The CMOS inverter 12 functions as the comparator. The resistor 14 is selected to develop a voltage drop thereacross equal to the potential difference $V_C - V_B = \Delta V$ shown in FIG. 2. The inverting potential at the junction of the gate electrodes of the CMOS inverter 11 and consequently the potential at input 15 is set to the clamp voltage $V_C$. When the synchronization polarity is positive, the resistor 14, is inserted in VSS of the inverter 11 and a PMOS transistor is used for the MOS analog switch 13 so that the synchronization signal is separated in the same manner as that for the negative synchronization polarity.

In the first embodiment shown in FIG. 1, the high precision synchronous signal separation is attained because the comparator 1 and the clamp voltage generation circuit 2 are separate. In the second embodiment shown in FIG. 3, the circuit can be constructed in a simple manner by using the CMOS integrated circuit.

In accordance with the present invention, the comparator circuit having the predetermined reference potential and the bias circuit which produce the output voltage shifted from the reference potential by the predetermined amount are provided. Thus, the circuit can be implemented by the MOS integrated circuit. When it is implemented by the bipolar devices, a high precision synchronous signal separation is a attained.

What I claimed is:

1. An integrated circuit for separating a synchronous signal from a video signal including the synchronous signal comprising:

comparator means (12) for receiving the video signal and for generating a pulse signal whose voltage assumes one of two levels in response to the voltage of the video signal, said comparator means outputting the pulse signal as a separated synchronous signal; and biasing means (11, 13, 14) comprising a bias voltage generating means (11, 14) for generating a bias voltage, and switch means (13) for receiving the pulse signal and for applying the bias voltage to the comparator means, wherein said comparator means comprises an inverter including a MOS transistor, and said bias voltage generating means comprises an inverter including a MOS transistor.

2. An integrated circuit according to claim 1, wherein each of said inverters is a C-MOS inverter.

3. An integrated circuit according to claim 1, wherein said bias voltage generating means further comprises a resistor for providing a voltage drop.

* * * * *

UNITED STATES PATENT AND TRADEMARK OFFICE
CERTIFICATE OF CORRECTION

PATENT NO. : 5,045,943
DATED : September 3, 1991
INVENTOR(S) : IKUO KURIHARA

It is certified that error appears in the above-identified patent and that said Letters Patent is hereby corrected as shown below:

<u>COLUMN 3</u>

Line 24, "claimed" should read --claim--.

Signed and Sealed this

Fourth Day of May, 1993

*Attest:*

MICHAEL K. KIRK

*Attesting Officer*     Acting Commissioner of Patents and Trademarks